United States Patent
Bäcklund et al.

(10) Patent No.: US 11,611,552 B2
(45) Date of Patent: Mar. 21, 2023

(54) METHOD FOR VERIFYING AN OPERATOR IN A SECURITY SYSTEM

(71) Applicant: Irisity AB, Gothenburg (SE)

(72) Inventors: Marcus Bäcklund, Lidingö (SE); Victor Hagelbäck, Nödinge (SE)

(73) Assignee: Irisity AB, Gothenburg (SE)

( * ) Notice: Subject to any disclaimer, the term of this patent is extended or adjusted under 35 U.S.C. 154(b) by 56 days.

(21) Appl. No.: 16/625,864

(22) PCT Filed: Jun. 19, 2018

(86) PCT No.: PCT/SE2018/050654
§ 371 (c)(1),
(2) Date: Dec. 23, 2019

(87) PCT Pub. No.: WO2019/009782
PCT Pub. Date: Jan. 10, 2019

(65) Prior Publication Data
US 2020/0153820 A1    May 14, 2020

(30) Foreign Application Priority Data
Jul. 5, 2017 (SE) .................................... 1750887-0

(51) Int. Cl.
*H04L 9/40* (2022.01)
*H04W 4/029* (2018.01)
*H04M 1/72457* (2021.01)

(52) U.S. Cl.
CPC ...... *H04L 63/0861* (2013.01); *H04L 63/0853* (2013.01); *H04L 63/107* (2013.01); *H04M 1/72457* (2021.01); *H04W 4/029* (2018.02)

(58) Field of Classification Search
CPC . H04L 63/107; H04L 9/3231; H04L 63/0853; H04L 63/0884; H04L 63/0892; H04L 63/0861; H04L 67/18; G06F 21/32; G06F 21/34; G06F 21/35; G06F 2221/2111; H04W 4/02; H04W 4/029
See application file for complete search history.

(56) References Cited

U.S. PATENT DOCUMENTS

| | | |
|---|---|---|
| 6,802,005 B1 | 10/2004 | Berson |
| 7,004,389 B1 | 2/2006 | Robinson et al. |
| 7,764,812 B2 * | 7/2010 | McQuaide, Jr. ... G08B 21/0261 340/539.13 |
| 2008/0095409 A1 * | 4/2008 | McQuaide ......... G08B 21/0261 382/115 |

(Continued)

OTHER PUBLICATIONS

International Search Report and Written Opinion for International Application No. PCT/SE2018/050654 dated Sep. 28, 2018, 14 pages.

(Continued)

*Primary Examiner* — Olugbenga O Idowu
(74) *Attorney, Agent, or Firm* — RMCK Law Group, PLC

(57) ABSTRACT

The present disclosure relates to a computer implemented method for verifying a computing device and preferably an operator associated with a security system, wherein the security system is specifically adapted for ensuring that the correct security operator is performing the correct task. The present disclosure also relates to a corresponding security system and a computer program product.

17 Claims, 2 Drawing Sheets

(56) References Cited

U.S. PATENT DOCUMENTS

| | | | |
|---|---|---|---|
| 2011/0112943 A1 | 5/2011 | Dietz et al. | |
| 2014/0317005 A1* | 10/2014 | Balwani | B65D 81/38 |
| | | | 705/317 |
| 2015/0113616 A1 | 4/2015 | Sampas | |
| 2016/0342784 A1 | 11/2016 | Beveridge et al. | |
| 2017/0055120 A1 | 2/2017 | Shaffer et al. | |
| 2017/0076306 A1* | 3/2017 | Snider | G06Q 30/0205 |

OTHER PUBLICATIONS

Extended European Search Report dated Mar. 9, 2021 for EP Application No. 18827533.3, 8 pages.

\* cited by examiner

METHOD FOR VERIFYING AN OPERATOR IN A SECURITY SYSTEM

CROSS-REFERENCE TO RELATED APPLICATIONS

This application is a 371 U.S. National Stage of International Application No. PCT/SE2018/050654, filed Jun. 19, 2018, which claims priority to Swedish Patent Application No. 1750887-0, filed Jul. 5, 2017. The disclosures of each of the above applications are incorporated herein by reference in their entirety.

TECHNICAL FIELD

The present disclosure relates to a computer implemented method for verifying a computing device and preferably an operator associated with a security system, wherein the security system is specifically adapted for ensuring that the correct security operator is performing the correct task. The present disclosure also relates to a corresponding security system and a computer program product.

BACKGROUND

In a conventional security system, a plurality of security devices, such as security cameras, are typically used for monitoring and surveillance of different locations of interest, sometimes denoted as security sites, where the video streams generated by the plurality of cameras are summoned to a human operator for deciding if any abnormalities exist. In some instances, the security system may additionally comprise a computer system performing video processing of the video streams, such that the human operator only needs to be involved if the computer system automatically has decided that an abnormality is present, e.g. a possible alarm condition that needs interaction by the human operator. A security system may also comprise further security devices, such as motion detectors (e.g. PIR), magnetic contacts, passage control arrangements, etc.

With an increasing interest in the positive effects following the application and use of a security system, such as a reduced risk of sabotage and/or break-in, the security market is greatly expanding. However, with an increasing number security sites follows the need to engage a large staff, including e.g. installation technicians, operators, security guards, etc. With this in mind and for ensuring high security in the services performed by e.g. the installation technicians and the security guards it is necessary to provide means for ensuring that the correct person in fact is performing the task assigned to that person.

SUMMARY

According to an aspect of the present disclosure, the above is at least partly met by a computer implemented method performed by a security system for verifying a computing device associated with the security system, wherein the security system comprises a first computing device having a graphical user interface (GUI), the first computing device arranged at a first geographical location, a second mobile computing device adapted to be handled by the operator, and a server connected to the first and the second computing device over a network, wherein the method comprises the steps of receiving, at the server, a current geographical location for the second mobile computing device, comparing, at the server, a geographical location for a security task assigned to the operator to be performed the first geographical location with the current geographical location for the second mobile computing device, and presenting, if a result of the comparison indicates that the second mobile computing device is at the first geographical location, information at the GUI of the first computing device for allowing identification of the second computing device.

By means of the present disclosure, the server comprised with the security system is adapted to keep track on the operator associated with the security system and to ensure that the operator, such as e.g. a security guard or an installation technician or any other relevant person associated to the security system, is correctly identified/authenticated when he is to perform a security task at a specific (i.e. the first) geographical location.

In accordance to the present disclosure, a first computing device is arranged at the first geographical location, such as a security site, and the operator is provided with a second computing device, the second computing device being a mobile computing device such as a mobile phone, a table, a laptop, etc. The server receives information relating to a current geographical location and correlate this geographical location with a geographical location assigned to a security site were the first computing device is arranged. In case the comparison is indicates that the second computing device is at the correct geographical location, and then the server will provide information to be presented at a GUI of the first computing device for informing about the correct location. In case the comparison indicates a mismatch such information is correspondingly provided to the first computing device.

An advantage following the concept as provided by the present disclosure is that the operator may receive e.g. a direct verification that he/she is in fact at the correct geographical location (security site), thus allowing the operator to correctly proceed with completing the security task assigned to the operator and to be performed at or in the vicinity of the geographical location of the security site. In addition, the present disclosure allows also a person (such as a proprietor of the security site) or personnel at the security site to be informed at least that the second computing device in the operators possession is in fact the computing device that has been assigned to the security site.

In accordance to the present disclosure, the information relating to the result of the comparison is defined to be presented at the first computing device. The first computing device is typically not in the possession of the operator. Rather, the first computing device may be affixed at the security site (at the first geographical location) or may be in the possession of the person or personnel at the security site. In case the first computing device is fixed positioned at the security site it may be used for the above mentioned verification of that the operator is at the "correct" location, possibly without any further person/personnel at the security site being given any information relating to the result of the comparison. It should in any case be understood that the first computing device possibly may be mobile, as such provided as e.g. a mobile phone, a table, a laptop, etc.

Accordingly, since the information is presented at the GUI of the first computing device rather than at the first computing device, there is limited possibility for an unauthorized user/operator to manipulate the information to be used for verification of the second mobile computing device. This may be compared to a case where the result of the comparison is shown at the second mobile computing device, thus providing possibilities for the unauthorized user/operator to manipulate the information shown at the second mobile computing device.

In a preferred embodiment of the present disclosure, the first computing device is adapted to comprise a biometric sensor, and the information presented at the GUI of the first computing device comprises a request for a biometric input relating to the operator to be acquired using the biometric sensor of the first computing device. The server may further be adapted to receiving a representation of the biometric input of the operator, and to authenticating the operator based on a previously enrolled corresponding biometric input for the operator. Accordingly, the operator will be requested to provide a biometric input/sample that is to be verified at the server, thereby also verifying that the operator in possession of the second computing device in fact is the correct operator assigned to perform the task at the security site.

The biometric sensor may for example comprise at least one of a fingerprint sensor and a camera. The biometric sensor may however also be adapted to for capturing other types of biometric inputs, allowing for e.g. voice recognition, or any other present or future means for biometric verification to be applied. The first computing device may also possibly comprise more than a single type of biometric sensor, e.g. for receiving multiple biometric inputs relating to the operator. Accordingly, the operator may be acquired to input more than a single biometric input, such as two different types of biometric input. The selection of the two biometric inputs may be made by the server, thereby making it complicated for an unauthorized user/person/operator to know which type of biometric input that will be requested by the first computing device.

As an alternative or also, the first computing device or the GUI provided with the first computing device may be adapted to allow for other means acquiring identification data to be provided to the server for verifying the operator. For example, the first computing device may be adapted for scanning e.g. an identity card or driver license issued to the operator. The GUI may alternatively be adapted to allow e.g. the person or personnel at the security site to input identification data to be provided to the server for verifying the identity of the operator. Still further, the operator may possibly be provided with a "secret code" that is to be entered using the GUI of the first computing device, provided to the server, and used for identifying the operator. It may also be possible be extended to make use of a challenge-response approach where e.g. the person or personnel at the security site and operating the first computing device is presented a challenge within the GUI that is shown or spoken to the operator before the operator provides his response (to be verified at the server).

In a possible embodiment of the present disclosure, the information presented at the GUI of the first mobile computing device comprises an image or video of the operator. Accordingly, e.g. the person or personnel at the security site may be allowed to also visually verify the identity of the operator, such as before the operator is proceeding with performing the assigned task.

It may be preferred to store the information collected about the operator using the biometric sensor, e.g. using the fingerprint sensor, the camera or a microphone (for collecting an audio sample). Such information may possibly be used for allowing possible future disputes to be easily resolved when such stored information easily may be extracted from the security system.

According to another aspect of the present disclosure there is provided a security system adapted for verifying a computing device associated with the security system, wherein the security system comprises a first computing device having a graphical user interface (GUI), the first computing device arranged at a first geographical location, a second mobile computing device adapted to be handled by the operator, and a server connected to the first and the second computing device over a network, wherein security system is configured to receive, at the server, a current geographical location for the second mobile computing device, compare, at the server, a geographical location for a security task assigned to the operator to be performed the first geographical location with the current geographical location for the second mobile computing device, and present, if a result of the comparison indicates that the second mobile computing device is at the first geographical location, information at the GUI of the first computing device for allowing identification of the second computing device. This aspect of the present disclosure provides similar advantages as discussed above in relation to the previous aspect of the present disclosure.

According to a still further aspect of the present disclosure there is provided a computer program product comprising a non-transitory computer readable medium having stored thereon computer program means for operating a security system adapted for verifying a computing device associated with the security system, wherein the security system comprises a first computing device having a graphical user interface (GUI), the first computing device arranged at a first geographical location, a second mobile computing device adapted to be handled by the operator, and a server connected to the first and the second computing device over a network, wherein the computer program product comprises code for receiving, at the server, a current geographical location for the second mobile computing device, code for comparing, at the server, a geographical location for a security task assigned to the operator to be performed the first geographical location with the current geographical location for the second mobile computing device, and code for presenting, if a result of the comparison indicates that the second mobile computing device is at the first geographical location, information at the GUI of the first computing device for allowing identification of the second computing device. Also this aspect of the present disclosure provides similar advantages as discussed above in relation to the previous aspects of the present disclosure.

A software executed by the server for operation in accordance to the present disclosure may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily under

DETAILED DESCRIPTION

Figure 1:
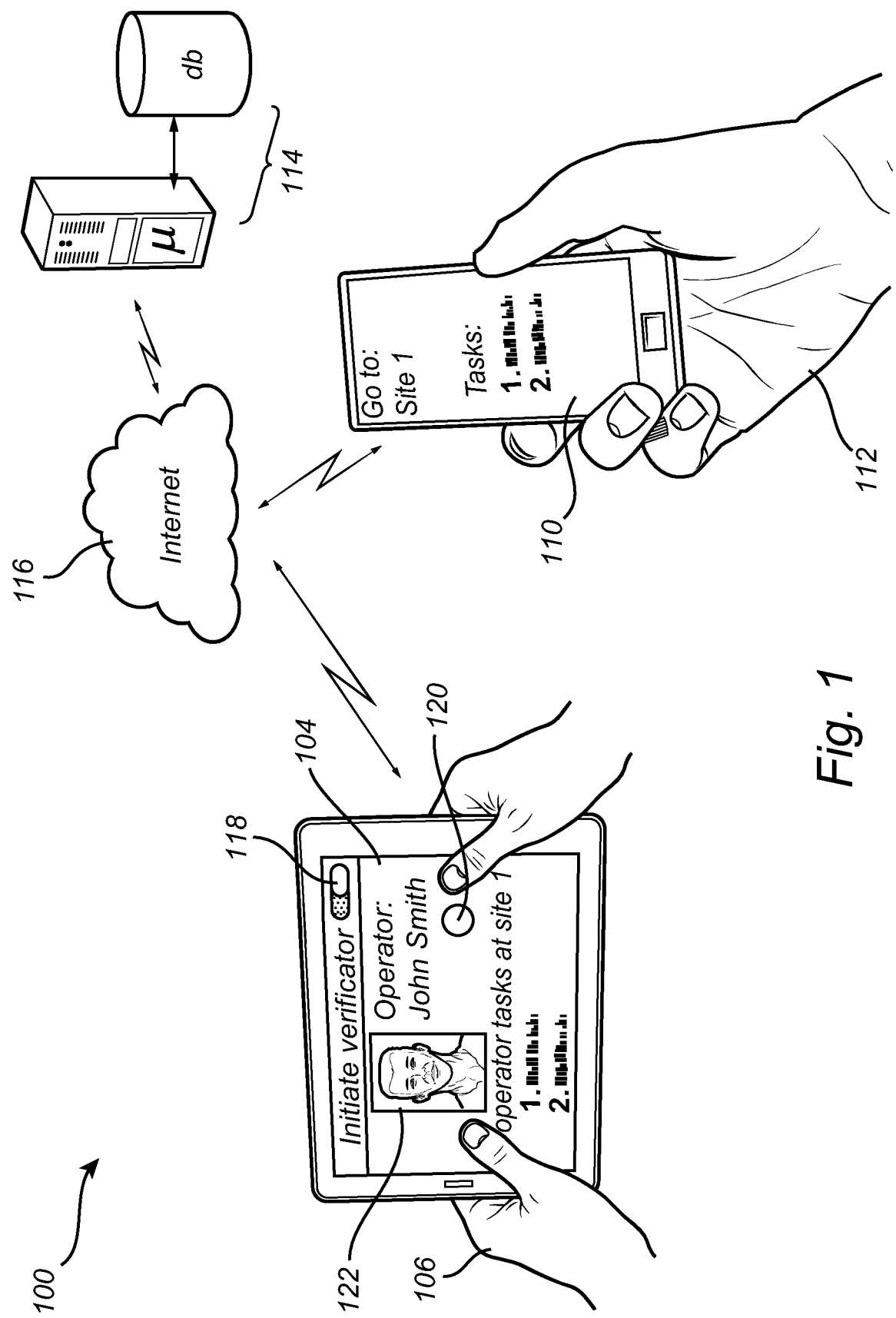
- FIG. 1 illustrates a security system according to a currently preferred embodiment of the present disclosure.
Figure 2:
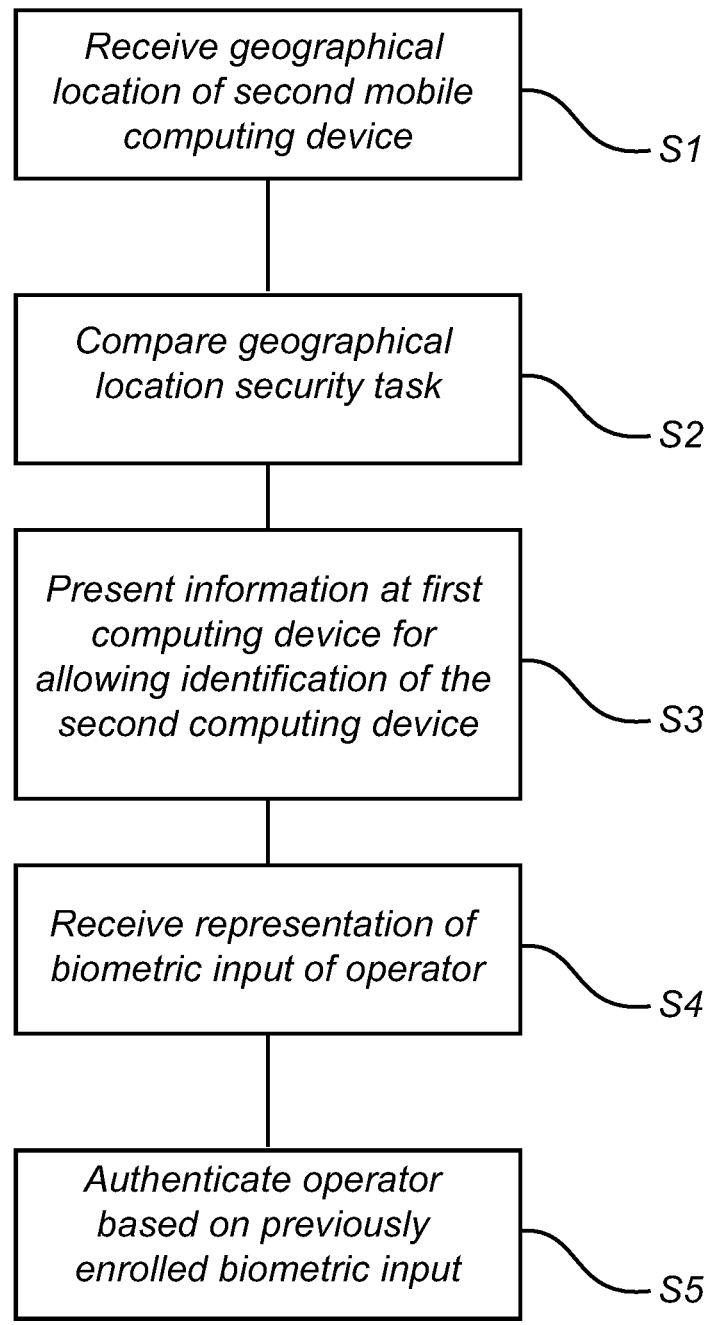
FIG. 2 shows a flow chart of a method according to an embodiment of the present disclosure.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled addressee. Like reference characters refer to like elements throughout.

Referring now to the drawings and to FIG. 1 in particular, there is depicted a security system 100 according to a possible embodiment of the present disclosure. The security system 100 comprises a first mobile computing 102 having a graphical user interface (GUI) 104 arranged at a security site and preferably adapted to be handled by a first user 106, a second mobile computing 108 having a GUI 110 adapted to be handled by an operator 112, and a server/database 114 connected to the first 102 and the second 108 mobile computing device over a network 116, such as the Internet. The first 102 and the second 108 mobile computing devices may for example be a laptop computer, a mobile phone, a tablet, etc. The first computing device may alternatively be affixed at the security site, e.g. provided as a wall mounted fixed installation.

The network 116 may be in part be wired or wireless, including for example wired connections like a building LAN, a WAN, an Ethernet network, an IP network, etc., and wireless connections like WLAN, CDMA, GSM, GPRS, 3G mobile communications, 4G mobile communications, Bluetooth, infrared, or similar.

The server 114 may in one embodiment be a cloud-based server. Thus, the computing power provided by means of the present disclosure may be distributed between a plurality of servers, and the location of the servers must not be explicitly defined. Advantageous following the use of a cloud-based solution is also the inherent redundancy achieved.

As illustrated in FIG. 1, the GUI 110 of the second mobile computing device 108 is exemplified to show an instruction to the operator 112. Specifically, the operator 112 is instructed to travel to the security site to perform a plurality of security tasks. The instruction and the security tasks comprised with instruction is determined by the server 114.

Once the operator 112 has reached the security site he meets up with the first user 106, the first user 106 being an employee at the security site, where the security site is a construction site. The tasks assigned to the operator 112 include patrolling the grounds of the construction site.

For verifying that the operator 112 and the second mobile computing device 108 are in fact the correct operator and the correct second computing device 108, for example the first user 106 may use a feature provided by the GUI 104 for initiating the verification process as defined in accordance to the present disclosure. For example, the GUI 104 may comprise a button 118 to be pressed by the first user 106 for initiating the verification process. It should however be understood that also the operator 112 may initiate the verification process, e.g. using a similar feature provided within the GUI 110 of the second computing device 108.

Once the verification process has been initiated, the server 114 sends a request to the second computing device 108 for a current geographical location of the second computing device 108. In the illustration provided in FIG. 1 the second computing device 108 is a smartphone provided with a GPS receiver (not explicitly shown) adapted to determine a geographical location of the second computing device 108. Geolocation data generated by the GPS receiver is subsequently transmitted to the server 114, where the server 114 compares the geolocation data with previously provide geographical location data relating to the security site where the operator 112 is to perform the task.

In case the comparison indicates that the second computing device 108 is located at the correct geographical location, i.e. at or close to the geographical location of the security site as stored at the server 114 (possibly within a predefined radius of the geographical location stored at the server 114), then information relating to the positive match is presented at the GUI 104 of the first computing device 102. For ensuring that not only the second computing device 108 is at the correct location, but that also the operator 112 is the correct operator, then the GUI 104 of the first computing device presents a request to the operator 112 for providing a biometric input.

In the illustrated embodiment of FIG. 1, the first computing device 102 is further equipped with a fingerprint sensor 120 adapted to capture a biometric input of the operator 112 in the form of a fingerprint representation. A plurality of identifiable fingerprint features may subsequently be extracted from the fingerprint representation. The feature extraction may be performed at the first mobile computing device 102 or at the sever 114 by providing the (e.g. complete) fingerprint representation. The server 114 may then be adapted to compare the extracted fingerprint features with an enrolled version of the fingerprint of the operator 112 for authenticating the operator 112.

Once the operator 112 has been authenticated, information relating to the same is provided to the first computing device 102 for presentation within the GUI 104 of the first computing device 102. Additionally to providing an indication of a positive authentication it may also be possible to adapt the server 114 to transmit e.g. a photo of the operator 112 to be presented within a dedicated area 122 of the GUI 104 of the first computing device.

Following a positive authentication of the second computing device 102 and the operator 112 the operator 112 may be allowed to perform the security tasks assigned by the server 114 to the operator 112.

The above description has been given in relation to the operator 112 providing a biometric input in the form of a fingerprint to the server 114 for authenticating the operator 112. However, as indicated above it should be understood that the first (mobile) computing device 102 additionally or also may be equipped with e.g. a camera and/or a microphone for collecting further or other biometric input relating to the operator 112. Accordingly, the server 114 may possibly store biometric enrollment data e.g. for iris, face, body-shape, hand-shape, voice authentication of the operator. Other possibilities, present and future, are possible and within the scope of the present disclosure.

In summary, the present disclosure relates to a computer implemented method performed by a security system 100 for verifying a computing device associated with the security system 100, wherein the security system 100 comprises a first computing device 102 having a graphical user interface (GUI) 104, the first computing device 102 arranged at a first geographical location, a second mobile computing device 108 adapted to be handled by an operator 112, and a server 114 connected to the first 102 and the second 108 computing device over a network 116, wherein the method comprises the steps of receiving, S1, at the server 114, a current geographical location for the second mobile computing device 108, comparing, S2, at the server 114, a geographical location for a security task assigned to the operator 112 to be performed the first geographical location, and presenting, S3, if a result of the comparison indicates that the second mobile computing device 108 is at the first geographical location, information at the GUI 104 of the first computing device 102 for allowing identification of the second computing device 108. The present disclosure preferably also comprises the steps of receiving, S4, at the server 114 and provided by the first computing device 102, a representation of a biometric input of the operator 112, and authenticating, S5, at the server 114, the operator 112 based on a previously enrolled corresponding biometric input for the operator 112.

By means of the present disclosure, the operator may receive a direct verification that he is in fact at the correct geographical location, thus allowing the operator to correctly proceed with completing the security task assigned to the operator and to be performed at or in the vicinity of the geographical location of the security site. In addition, the present disclosure allows also a person (such as a proprietor of the security site) or personnel at the security site to be informed at least that the second computing device in the operators possession is in fact the computing device that has been assigned to the security site. Using the biometric verification also the identity of the operator may be verified.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer implemented method performed by a security system for verifying a computing device associated with the security system, wherein the security system comprises:
   a first computing device having a graphical user interface (GUI), the first computing device arranged at a first geographical location and comprising a plurality of biometric sensors,
   a second mobile computing device adapted to be handled by an operator, and
   a server connected to the first and the second computing device over a network, wherein the method comprises:
      receiving, at the server, a current geographical location for the second mobile computing device,
      comparing, at the server, a geographical location for a security task assigned to the operator to be performed at the first geographical location with the current geographical location for the second mobile computing device,
      presenting, if a result of the comparison indicates that the second mobile computing device is at the first geographical location, information relating to a positive match between the location of the second mobile computing device and the location of the security task at the GUI of the first computing device for allowing identification of the second computing device, the information comprising a request for one or more biometric inputs relating to the operator to be acquired using the plurality of biometric sensors of the first computing device, wherein the server selects a specific type of each of the requested biometric inputs from a plurality of different types of biometric inputs, receiving, at the server and provided by the first computing device, a representation of the one or more biometric inputs of the operator, and authenticating, at the server, the operator based on a previously enrolled corresponding biometric input for the operator.

2. The method according to claim 1, wherein the biometric sensor comprises at least one of a fingerprint sensor and a camera.

3. The method according to claim 1, wherein the first computing device is a mobile computing device operated by a user.

4. The method according to claim 1, wherein the first computing device is a fixed positioned computing device operated by the operator.

5. The method according to claim 3, wherein the information presented at the GUI of the mobile computing device comprises an image or video of the operator.

6. A security system adapted for verifying a computing device associated with the security system, wherein the security system comprises:
a first computing device having a graphical user interface (GUI), the first computing device arranged at a first geographical location and comprising a plurality of biometric sensors,
a second mobile computing device adapted to be handled by an operator, and
a server connected to the first and the second computing device over a network, wherein security system is configured to:
receive, at the server, a current geographical location for the second mobile computing device,
compare, at the server, a geographical location for a security task assigned to the operator to be performed at the first geographical location with the current geographical location for the second mobile computing device,
present, if a result of the comparison indicates that the second mobile computing device is at the first geographical location, information relating to a positive match between the location of the second mobile computing device and the location of the security task at the GUI of the first computing device for allowing identification of the second computing device, the information comprising a request for one or more biometric inputs relating to the operator to be acquired using the plurality of biometric sensors of the first computing device, wherein the server selects a specific type of each of the requested biometric inputs from a plurality of different types of biometric inputs,
receive, at the server and provided by the first computing device, a representation of the one or more biometric inputs of the operator, and
authenticate, at the server, the operator based on a previously enrolled corresponding biometric input for the operator.

7. The security system according to claim 6, wherein the biometric sensor comprises at least one of a fingerprint sensor and a camera.

8. The security system according to claim 6, wherein the first computing device is a mobile computing device operated by a user.

9. The security system according to claim 8, wherein the first computing device is a smart phone.

10. The security system according to claim 6, wherein the first computing device is a fixed positioned computing device operated by the operator.

11. The security system according to claim 10, wherein the fixed first computing device is arranged at a site where the security task is to be performed by the operator.

12. A computer program product comprising a non-transitory computer readable medium having stored thereon computer program means for operating a security system adapted for verifying a computing device associated with the security system, wherein the security system comprises:
a first computing device having a graphical user interface (GUI), the first computing device arranged at a first geographical location and comprising a plurality of biometric sensors,
a second mobile computing device adapted to be handled by an operator, and
a server connected to the first and the second computing device over a network, wherein the computer program product comprises:
code for receiving, at the server, a current geographical location for the second mobile computing device,
code for comparing, at the server, a geographical location for a security task assigned to the operator to be performed at the first geographical location with the current geographical location for the second mobile computing device,
code for presenting, if a result of the comparison indicates that the second mobile computing device is at the first geographical location, information relating to a positive match between the location of the second mobile computing device and the location of the security task at the GUI of the first computing device for allowing identification of the second computing device, the information comprising a request for one or more biometric inputs relating to the operator to be acquired using the plurality of biometric sensors of the first computing device, wherein the server selects a specific type of each of the requested biometric inputs from a plurality of different types of biometric inputs,
code for receiving, at the server and provided by the first computing device, a representation of the one or more biometric inputs of the operator, and
code for authenticating, at the server, the operator based on a previously enrolled corresponding biometric input for the operator.

13. The method according to claim 1, wherein the first computing device is a fixed positioned computing device operated by the operator.

14. The computer program product according to claim 12, wherein the biometric sensor comprises at least one of a fingerprint sensor and a camera.

15. The computer program product according to claim 12, wherein the first computing device is a mobile computing device operated by a user.

16. The computer program product according to claim 15, wherein the information presented at the GUI of the mobile computing device comprises an image or video of the operator.

17. The computer program product according to claim 12, wherein the first computing device is a fixed positioned computing device operated by the operator.

* * * * *